United States Patent
Azam et al.

(10) Patent No.: US 10,393,131 B2
(45) Date of Patent: Aug. 27, 2019

(54) ROLLING BEARING FOR BLADE ROOT AND MANUFACTURING METHOD, SYSTEM, OSCILLATING SYSTEM, AND ROTATING SYSTEM COMPRISING SUCH A BEARING

(71) Applicant: NTN-SNR ROULEMENTS, Annecy (FR)

(72) Inventors: Guy Azam, Pugnychatenod (FR); Guillaume Lefort, Annecy (FR)

(73) Assignee: NTN-SNR ROULEMENTS, Annecy (FR)

( * ) Notice: Subject to any disclaimer, the term of this patent is extended or adjusted under 35 U.S.C. 154(b) by 322 days.

(21) Appl. No.: 15/361,157

(22) Filed: Nov. 25, 2016

(65) Prior Publication Data
US 2017/0152858 A1 Jun. 1, 2017

(30) Foreign Application Priority Data
Nov. 27, 2015 (FR) ..................... 15 61471

(51) Int. Cl.
| | |
|---|---|
| *F04D 29/059* | (2006.01) |
| *F04D 29/049* | (2006.01) |
| *F16C 19/18* | (2006.01) |
| *F16C 33/78* | (2006.01) |
| *F16C 43/04* | (2006.01) |

(Continued)

(52) U.S. Cl.
CPC ......... *F04D 29/059* (2013.01); *F04D 29/049* (2013.01); *F16C 19/184* (2013.01);
(Continued)

(58) Field of Classification Search
CPC ..... F04D 29/059; F04D 29/049; B64C 11/06; F16C 43/045; F16B 39/028
(Continued)

(56) References Cited

U.S. PATENT DOCUMENTS 2,460,910 A * 2/1949 Sheets ..................... B64C 11/06
416/205
2,628,685 A * 2/1953 Diefenderfer ........... B64C 11/06
416/158

(Continued)

FOREIGN PATENT DOCUMENTS

| FR | 2 862 609 A1 | 5/2005 | |
|---|---|---|---|
| GB | 546510 A * | 7/1942 | ............. B64C 11/06 |

(Continued)

OTHER PUBLICATIONS

FR Search Report, dated Jul. 21, 2016, from corresponding FR application.

*Primary Examiner* — Hung Q Nguyen
*Assistant Examiner* — Mark L. Greene
(74) *Attorney, Agent, or Firm* — Young & Thompson

(57) ABSTRACT

The rolling bearing for a blade root includes an outer ring (13) and an inner ring (12). An inner space (43) is defined between the inner surface (33) of the outer ring (13) and the outer surface (25) of the inner ring (12). At a distal end (46), the inner space (43) is closed off by a distal sealing system (47) between the outer ring and the inner ring. A system (57) for retaining the distal sealing system (47) includes a retaining body (58), and a thread/tapping system provided on a peripheral assembly surface of the retaining body and on a peripheral surface of the facing inner or outer ring. The retaining body (58) is screwable into a retention position in which an axial abutment surface (61) of the retaining body forms an axial stop for the distal sealing system longitudinally (B), in the proximal->distal direction.

12 Claims, 4 Drawing Sheets

(51) Int. Cl.
*F16C 19/50* (2006.01)
*F16C 33/60* (2006.01)
*B64C 11/06* (2006.01)

(52) U.S. Cl.
CPC .......... *F16C 19/186* (2013.01); *F16C 19/505* (2013.01); *F16C 33/60* (2013.01); *F16C 33/783* (2013.01); *F16C 33/7886* (2013.01); *F16C 43/045* (2013.01); *B64C 11/06* (2013.01); *F16C 2226/60* (2013.01); *F16C 2326/43* (2013.01)

(58) Field of Classification Search
USPC .................... 411/285, 286, 288, 290, 291
See application file for complete search history.

(56) References Cited

U.S. PATENT DOCUMENTS

| | | | |
|---|---|---|---|
| 3,463,237 A | | 8/1969 | Quenneville et al. |
| 5,415,527 A | * | 5/1995 | Godwin .................. B64C 11/06 416/205 |
| 6,367,980 B1 | * | 4/2002 | Kobayashi ............. A61B 6/035 384/504 |
| 2012/0230798 A1 | * | 9/2012 | Sterle .................... F16B 39/028 411/120 |

FOREIGN PATENT DOCUMENTS

| | | |
|---|---|---|
| GB | 2 192 943 A | 1/1988 |
| GB | 2 271 392 A | 4/1994 |
| GB | 2 409 708 A | 7/2005 |

\* cited by examiner

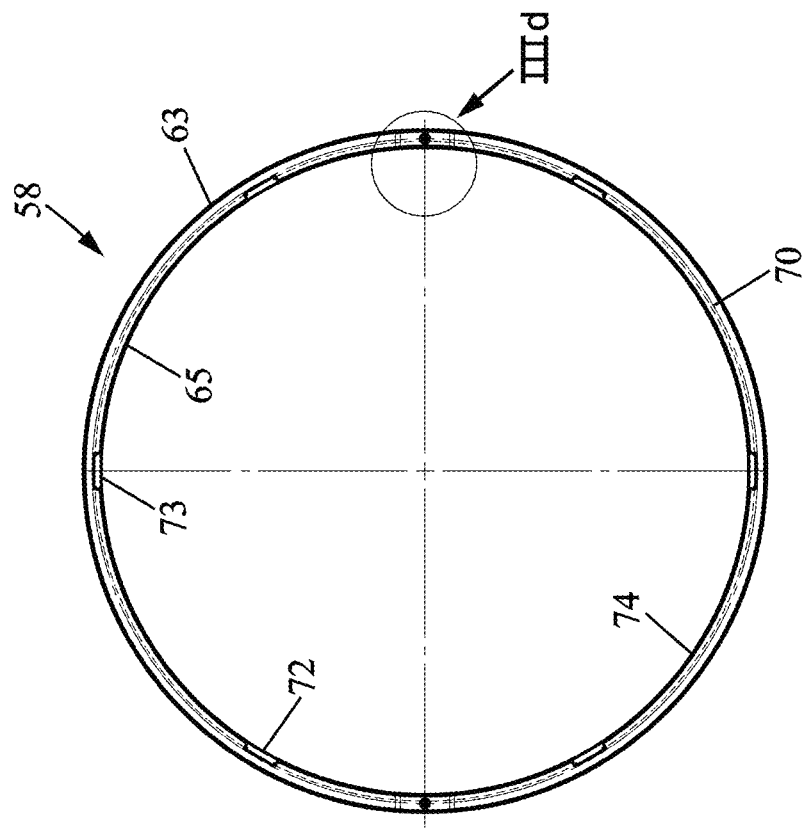
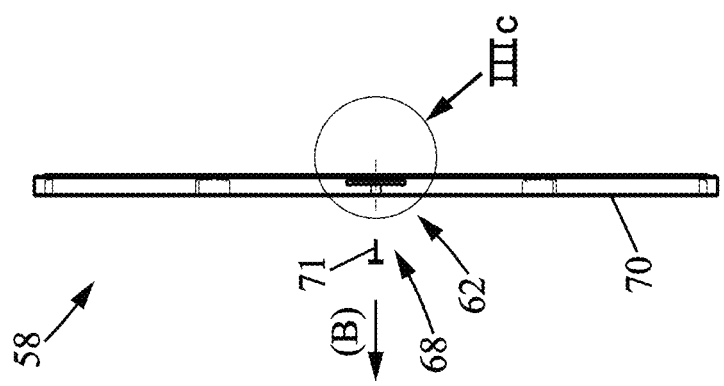
FIG. 3b
FIG. 3a

ROLLING BEARING FOR BLADE ROOT AND MANUFACTURING METHOD, SYSTEM, OSCILLATING SYSTEM, AND ROTATING SYSTEM COMPRISING SUCH A BEARING

FIELD OF THE INVENTION

The invention relates to the field of rolling bearings for blade roots and to their manufacturing methods. It also relates to systems, oscillating systems, and rotating systems comprising such bearings.

BACKGROUND TO THE INVENTION

More specifically, the invention relates to the field of blades with variable angle of attack in a rotating housing of an aircraft propeller, or other applications.

FR 2,862,609 describes an example of such a product where the blade is assembled in a housing (called a "hub" in that document) by one of its ends, called the blade root. The root is mounted so as to pivot about an axis substantially perpendicular to and intersecting with the rotor axis in a chamber of the housing. This pivoting, driven by a device (not shown) coupled to an extension of a cap closing off the root, allows adjusting the angle of attack of the blade.

The chamber comprises a stepped side wall, rotationally symmetrical about a radial axis of the propeller which, after installation of the blade, is substantially coincident with the axis of the blade. An inner side of the chamber opens toward the center of the propeller and an outer side opens toward the blade (in that document, and in that context, the terms "inner side and outer side" refer to the location along the radial axis of the propeller).

First and second rows of angular contact rolling elements are mounted between a skirt surrounding the root, and a respective cup and outer ring mounted on the side wall, in a conventional "O" assembly.

The rolling elements, arranged near the outer and inner sides respectively, are tapered rollers and angular contact ball bearings respectively. Each roller has its wide base facing outward.

The cup and the outer ring are supported on the wall by means of plastic protective parts. The outer ring on the inner side is supported on a first shoulder of the hub, preventing it from axial outward movement (in that document, in that context, the terms "inward" and "outward" are used in the conventional manner to describe a bearing, designating the radial location relative to an axis of the bearing).

Inner races for the rollers and ball bearings are respectively formed in the protective skirt.

When the propeller rotates, the blade undergoes two actions:
- an axial or centrifugal force for the blade and the rolling bearing that is a function of its speed and mass,
- a bending moment at the blade root due to radial force on the blade resulting from the interaction between the blade and the air it is moving.

To withstand these actions effectively, the rolling bearings are preloaded, in other words a compression of their rolling elements between their races is created and maintained.

While this implementation is entirely satisfactory, there is always a search for ways to improve the performance of these products, maximizing the forces they can withstand while minimizing their footprint.

These research efforts have led to entirely redesigning the product architecture of rolling bearings for blade roots.

In particular, these research efforts have led to an interest in improving the bearing lubrication.

Improving the lubrication of such a bearing is a challenge because, during operation, the lubricant is subjected to centrifugal force. This results in the possibility of lubricant leakage, which may cause damage to a bearing intended to operate with a given amount of lubricant, and/or to the engine due to an excessive imbalance interfering with its operation.

SUMMARY OF THE INVENTION

The following is a description of the invention.

According to a first aspect, an object of the invention is a rolling bearing for a blade root extending in a longitudinal direction between a proximal end and a distal end, the bearing allowing oscillation of the root about an axis extending in the longitudinal direction relative to a housing, the rolling bearing comprising:
  at least one outer ring having an inner surface and an outer surface opposite to the inner surface, the inner surface of the outer ring having at least one outer race,
  at least one inner ring having an inner surface and an outer surface opposite to the inner surface, the outer surface of the first inner ring having at least one inner race,
    an inner space being defined between the inner surface of said at least one outer ring and the outer surface of said at least one inner ring, the inner space extending between a proximal end where it is closed off by a proximal sealing system between at least one outer ring and at least one inner ring and a distal end where it is closed off by a distal sealing system between at least one outer ring and at least one inner ring,
  at least one row of rolling elements mounted in the inner space, rolling on the outer and inner races,
  A system for retaining the distal sealing system, comprising a retaining body and a thread/tapping system formed on a peripheral assembly surface of the retaining body and on a peripheral surface of one among the inner and outer rings facing the peripheral assembly surface of the retaining body, the retaining body being screwable into a retention position in which an axial abutment surface of the retaining body forms an axial stop for the distal sealing system longitudinally, in the proximal->distal direction.

By means of these arrangements, the distal sealing system is held in place against the action of the centrifugal force, which improves the fluidtightness of the bearing.

According to one embodiment, the retention system further comprises a system to prevent the unscrewing of the retaining body.

According to one embodiment, the system to prevent unscrewing comprises a radial slot extending from the peripheral assembly surface of the retaining body, separating a proximal portion from a distal portion of the retaining body, and a biasing system urging the proximal portion and the distal portion away from one another while tending to open said slot.

According to one embodiment, the biasing system comprises an axial bore formed in the distal portion of the retaining body and opening into the radial slot, and a screw having a bearing portion, axially screwable into the bore until it bears against the proximal portion of the retaining body.

According to one embodiment, the system to prevent unscrewing comprises a plurality of slots distributed circumferentially around the axis and a plurality of biasing systems, each associated with a slot.

According to one embodiment, the retaining body further comprises an assembly/disassembly relief.

According to one embodiment, the assembly/disassembly relief comprises at least one notch formed on a mounting surface of the retaining body and having a shape complementary to a tool for assembly/disassembly of the retaining body.

According to another aspect, the invention relates to a system comprising a rolling bearing for a blade root, and an assembly/disassembly tool complementary to the assembly/disassembly relief, which can be secured to and detached from the retaining body, adapted for screwing the retaining body into the retention position.

According to another aspect, the invention relates to an oscillating system comprising a rolling bearing, a housing assembled to the shoulder for assembly to a housing of the outer surface of the single outer ring, a blade comprising a blade root assembled to the shoulder for assembly to a blade root of the inner surface of the first inner ring, the blade being mounted so as to oscillate about said axis extending in the longitudinal direction relative to the housing by means of the rolling bearing.

According to another aspect, the invention relates to a system rotating about an axis of rotation, the system comprising at least one oscillating system extending radially relative to the axis of rotation, the rolling bearing being distanced from the axis of rotation.

According to another aspect, the invention relates to a method for manufacturing a rolling bearing for a blade root, wherein:
- there is provided: at least one outer ring having an inner surface and an outer surface opposite to the inner surface, the inner surface of the outer ring having at least one outer race; at least one inner ring having an inner surface and an outer surface opposite to the inner surface, the outer surface of the inner ring having at least one inner race, an inner space being defined between the inner surface of said at least one outer ring and the outer surface of said at least one inner ring, the inner space extending between a proximal end where it is closed off by a proximal sealing system between at least one outer ring and at least one inner ring and a distal end where it is closed off by a distal sealing system between at least one outer ring and at least one inner ring; and at least one row of rolling elements mounted in the inner space, rolling on the first outer and inner races, with a portion of a thread/tapping system on a peripheral surface of one among the inner and outer rings,
- a retaining body is provided, comprising a portion of a thread/tapping system on a peripheral assembly surface of the retaining body,
- the portions of the thread/tapping system are placed opposite one another,
- the retaining body is screwed into a retention position in which an axial abutment surface of the retaining body forms an axial stop for the distal sealing system longitudinally, in the proximal->distal direction.

According to one embodiment, a system to prevent the unscrewing of the retaining body is subsequently applied.

BRIEF DESCRIPTION OF THE DRAWINGS

The figures of the drawings are now briefly described.

FIG. 3a is a side view of the retention system according to one exemplary embodiment.
FIG. 3b is a front view of the retention system of FIG. 3a.

The following is a detailed description of several embodiments of the invention, accompanied with examples and with reference to the drawings.

DETAILED DESCRIPTION OF THE INVENTION

Figure 1:
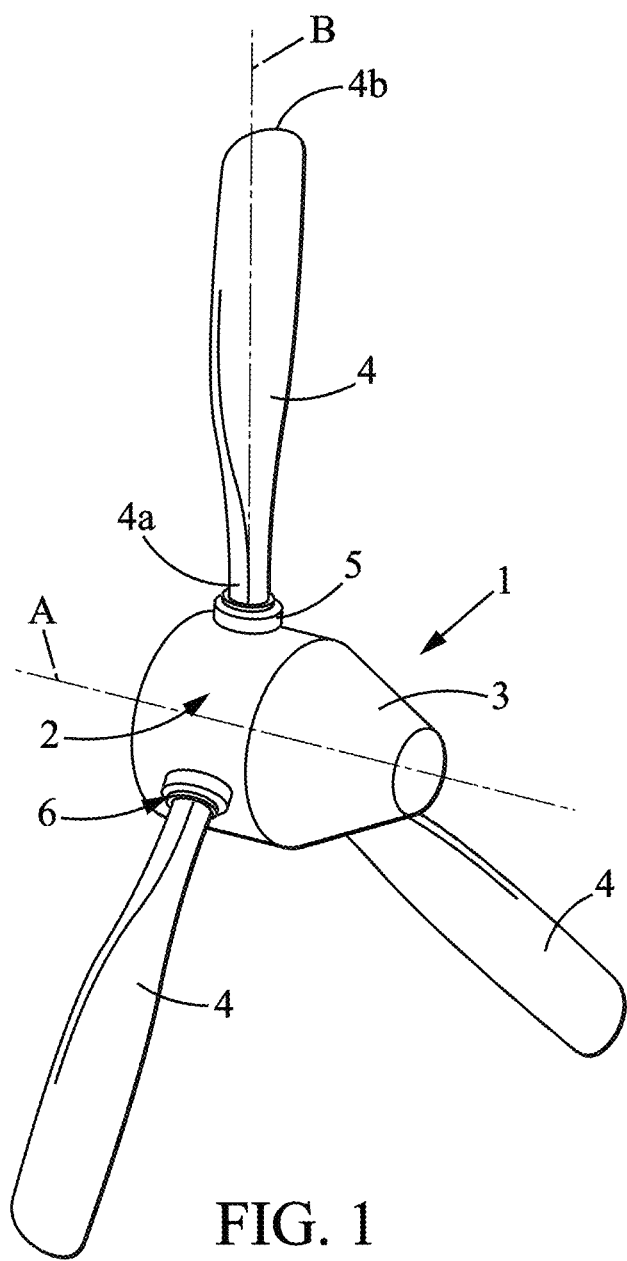
FIG. 1 is a schematic perspective diagram of a rotor.

FIG. 1 schematically represents a three-dimensional perspective view of an example of a rotating system 1 according to an exemplary embodiment of the invention. The rotating system 1 comprises a hub (not shown) of axis A about which a rotor 2 is rotatably mounted. The rotor 2 rotates relative to the hub about the axis A. The rotor 2 comprises a main body 3, for example rotationally symmetrical about the axis A. The rotor 2 also comprises one or more blades 4 (in the example, three blades 4), each extending radially relative to the hub. Each blade 4 extends along a longitudinal axis B. As a blade may have a very complex shape, it is difficult to precisely define the longitudinal axis B, except that it corresponds to the main direction of the blade 4. Also, when describing the blade 4 as extending "radially", this does not necessarily mean that the B axis intersects the A axis or extends in a plane perpendicular to the A axis, but that the general direction of the blade 4 is radial.

The blade 4 extends between one end, called the blade root 4a, where it is joined to the main body 3, and a free opposite end 4b. The blade 4 is mounted, at its root 4a, in a housing 5 secured to the main body 3. The blade 4 is mounted so as to oscillate in the housing 5 by means of a rolling bearing (described in detail below) mounted between the blade root 4a and the housing 5. The rolling bearing in question has a rolling axis, and oscillation of the blade 4 relative to the housing 5 is allowed relative to this axis. The axis in question is clearly defined and extends substantially along the B axis. To better understand this concept, one can consider the B axis as corresponding to the axis of the rolling bearing, and the axis of the rolling bearing will therefore be referred to as B.

During operation, the blade 4 rotates relative to the housing 5 about the B axis, but in principle along an angular path of less than 360°. On the other hand, the blade 4 will oscillate relative to the housing 5 about the B axis in controlled back-and-forth movements, according to the forces transmitted by the blade to the surrounding fluid (air).

The housing 5 is any component enabling this implementation.

As explained above, the rolling bearing is therefore eccentric with respect to the A axis, and is therefore subjected to strong centrifugation about the A axis during use of the rotating system 1.

The present invention is described in a specific context, but seems applicable to other contexts with a rolling bearing oscillating about a radial axis and spinning around an axial axis.

The assembly of the housing 5, rolling bearing, and blade root 4a is thus called an oscillating system 6.

Figure 2:
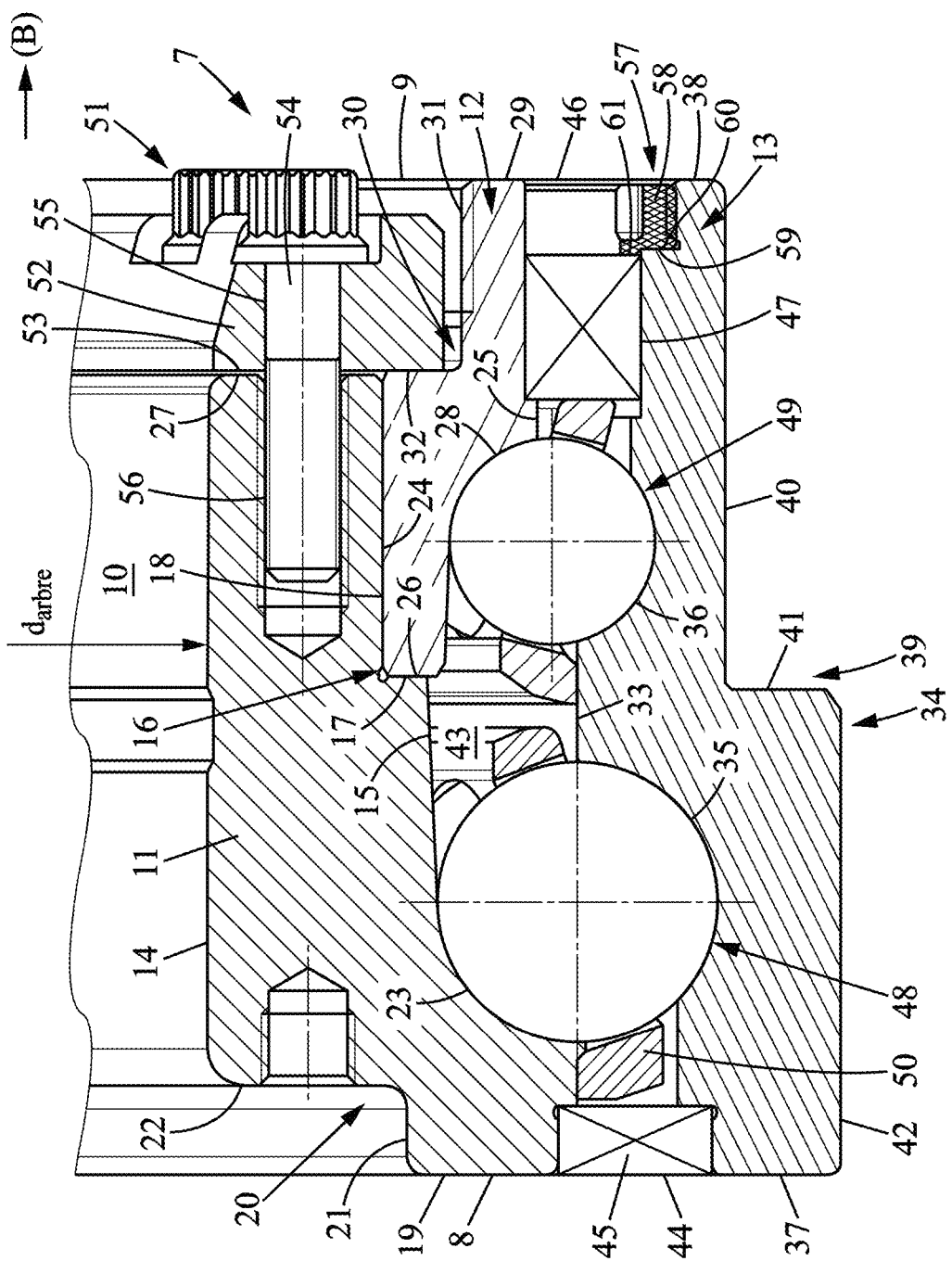
FIG. 2 is a sectional view of an exemplary embodiment of a rolling bearing for a blade root.
Figure 4:
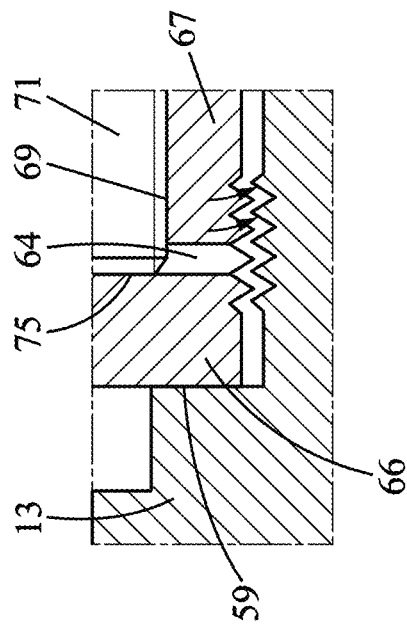
FIG. 4 is a detailed sectional view of the system to prevent unscrewing.

FIG. 2 represents an embodiment of a rolling bearing according to the invention.

In the following, the term "axial" refers to the B axis of the rolling bearing 7, parallel to the direction represented (B). The term "proximal" refers to the proximity of a component to the A axis, while the term "distal" refers to a component being more distant from the A axis.

The rolling bearing 7 thus comprises a proximal side 8, and a distal side 9 opposite to the proximal side 8.

The rolling bearing 7 defines an inner bore 10 within which the blade root 4 is to be mounted.

In the following, the term "inner" is used to designate proximity to the B axis, while the term "outer" is used to designate being more distant from the B axis.

The rolling bearing 7 comprises a first inner ring 11, a second inner ring 12, and a single outer ring 13. The inner rings 11 and 12 are so named because they each provide an inner race for rolling elements, and the outer ring 13 is so named because it provides outer races for rolling elements, as will be explained in more detail below.

The first inner ring 11 comprises an inner surface 14 and an outer surface 15 opposite to the inner surface 14. The inner surface 14 may have any suitable geometry. For example, the inner surface 14 may be composed of two rotationally symmetrical cylindrical surfaces each in line with a row of rolling elements, with an interposed groove in the center. The inner surface 14 is used for mounting the rolling bearing 7 on the blade root. The inner surface 14 has a minimum diameter $d_{shaft}$. The first inner ring 11 extends axially from the proximal side 8 towards the distal side 9, along a large majority of the axial length of the rolling bearing 7.

In the distal half of the rolling bearing 7, the outer surface 15 of the inner ring 12 defines a distal seat 16 for receiving the second inner ring 12. The distal seat 16 comprises an axial abutment surface 17 facing the distal side 9, and a cylindrical receiving surface 18 facing outwardly and extending from the axial abutment surface 17.

In the proximal half of the rolling bearing 7, the outer surface 15 defines a proximal first race 23.

The first inner ring 11 has a proximal end surface 19. The inner surface 14 of the first inner ring 11 comprises a shoulder 20 for assembly to a blade root. The shoulder 20 comprises a cylindrical surface 21 extending from the proximal end surface 19 towards the distal end, an axial abutment surface 22 facing the proximal side 8 and extending from the cylindrical surface 21 to the bore 10.

The first inner ring 11 has a distal end surface 27 opposite to the axial abutment surface 22 and facing the distal side 9.

The second inner ring 12 comprises an inner surface 24 and an outer surface 25 opposite to the inner surface 24. The inner surface 24 is used for assembling the second inner ring 12 into the seat 16 of the first inner ring. The inner surface 24 therefore faces, and is complementary to, the cylindrical receiving surface 18. The second inner ring 12 extends axially in the direction of the distal side 9, from a first axial abutment surface 26 facing the proximal side 8, for approximately a distal half of the axial length of the rolling bearing 7.

The outer surface 25 defines a second distal race 28.

The second inner ring 12 has a distal end surface 29. The inner surface 24 of the second inner ring 12 comprises a shoulder 30 for preloading. The shoulder 30 comprises a cylindrical surface 31 extending from the distal end surface 29 to the proximal end, an axial abutment surface 32 facing the distal side 9 and extending from the cylindrical surface 31 to the cylindrical receiving surface 18.

The outer ring 13 comprises an inner surface 33 and an outer surface 34 opposite to the inner surface 33. The outer surface 34 is used for mounting the rolling bearing 7 on the housing. The outer ring 13 extends axially from the proximal side 8 to the distal side 9, for the entire axial length of the rolling bearing 7.

In the proximal half of the rolling bearing 7, the inner surface 33 defines a proximal second race 35. In the distal half of the rolling bearing 7, the inner surface 33 defines a distal second race 36.

The outer ring 13 has a proximal end surface 37 and an opposite distal end surface 38. The outer surface 34 comprises a shoulder 39 for assembly to the housing. The shoulder 39 comprises a cylindrical surface 40 extending from the distal end surface 38 towards the proximal end, an axial abutment surface 41 facing the distal side 9 and extending from the cylindrical surface 40 to a second cylindrical surface 42. The second cylindrical surface 42 extends from the axial abutment surface 41 to the proximal end surface 37.

A single inner space 43 is defined between the inner surface 33 of the outer ring 13 and the outer surface 15, 25 of the first and second inner rings 11, 12, the single inner space 43 extending between a proximal end 44 where it Is closed off by a proximal sealing system 45 between the outer ring 13 and the first inner ring 11, and a distal end 46 where it is closed off by a distal sealing system 47 between the outer ring 13 and the second inner ring 12.

In the single inner space 43, the proximal first outer and inner races 23, 35 face each other, and the distal second outer and inner races 28, 36 face each other.

A proximal first row of rolling elements 48 is mounted in the single inner space, rolling on the proximal first outer and inner races 23, 35. A distal second row of rolling elements 49 is mounted in the single inner space, rolling on the distal second outer and inner races 28, 36. The first and second rows of rolling elements 48, 49 are spaced apart from one another along the longitudinal axis B.

Where appropriate, the rolling elements of a same row are spaced apart from one another by a cage 50, as represented in FIG. 2 for the proximal row.

The rolling bearing 7 comprises a loading system 51 adapted to hold the second inner ring 12 in axial abutment against the first inner ring 11.

The loading system 51 comprises an annular plate 52 having a bearing surface 53 in contact with the second inner ring 12 and urging the second inner ring 12 in the axial direction, the annular plate 52 being kept secured to the first inner ring 11 by screws 54. More specifically, the plate 52 is screwed onto the inner ring 11 by screws passing through bores 55 of the plate 52 and bores 56 of the first inner ring 11 that are placed in alignment with the plate bores 55. The bearing surface 53 presses on the axial abutment surface 32, thereby urging the second inner ring 12 toward the proximal side, these clamping forces being applied at the contact between the axial abutment surface 17 of the first Inner ring 11 and the axial abutment surface 26 of the second inner ring 12. The screws are tightened until a loading force $F_{preload}$ is applied.

The rolling bearing 7 comprises a retention system 57 for retaining the distal sealing system 47. The retention system 57 is primarily arranged to prevent or limit axial displacement along axis (B) of the distal sealing system 47 due to the effect of centrifugal force during rotation of the rotor 2 about axis (A).

The retention system 57 comprises a retaining body 58. The retaining body 58 is assembled by an assembly system to one of the rings 12, 13 of the rolling bearing 7. In the present case, the retaining body 58 is assembled to the outer ring 13 of the rolling bearing 7 by the assembly system. Indeed, in addition to the centrifugal movement associated with rotation of the rotor, the lubricant tends to be thrown against the outer ring 13 during operation of the rotor (centrifugal effect with respect to axis (B)). Alternatively, however, the retaining body could be assembled to the inner ring which together with the outer ring 13 defines the inner space 43 at the distal end, in other words the second inner ring 12 in the present example. For clarity, the invention is described below using the example where the retaining body 58 is assembled to the outer ring 13.

The assembly of the retaining body 58 to the outer ring 13 is achieved, for example, by a thread/tapping system. For example, the retaining body 58 has an outer surface 63 forming a rotationally symmetrical cylinder about axis (B). A thread is formed for example on the outer peripheral surface of the retaining body 58. The inner surface 33 of the outer ring 13, facing the outer peripheral surface of the retaining body 58, has a complementary geometry to said surface, forming a rotationally symmetrical cylinder about axis (B), and a tapping complementary to the thread formed on the outer peripheral surface of the retaining body 58.

The retaining body 58 can thus be screwed into the outer ring 13 by a screwing movement about axis (B), to the retention position shown in FIG. 2.

Where appropriate, the outer ring 13 comprises an axial abutment surface 59 defining the retention position. An axial abutment surface 60 of the retaining body 58 abuts against the axial abutment surface 59 of the outer ring 13 in the retention position, and prevents further screwing movement along axis (B).

The retaining body 58 further comprises an axial abutment surface 61 for the distal sealing system 47. This axial abutment surface 61 is, for example, arranged radially inward relative to axial abutment surface 60. Axial abutment surface 61 is facing the distal sealing system 47. When the distal sealing system 47 is displaced along axis (B), it comes to rest against axial abutment surface 61, which limits this displacement in the proximal->distal direction.

In order to prevent unwanted unscrewing of the retaining body, for example due to vibrations, the retention system 57 may further comprise a system 62 to prevent the unscrewing of the retaining body 58.

This system is described here, in an embodiment which is still for the specific case of screwing the retaining body 58 into the outer ring. However, other embodiments can be envisaged from this description, in particular the case of screwing the retaining body 58 into the inner ring.

Figure 3D:
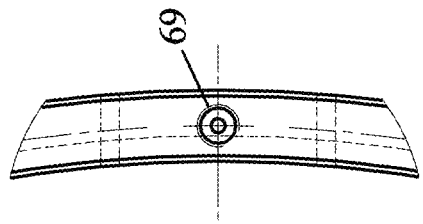
FIGS. 3c and 3d are detailed views of FIGS. 3a and 3b respectively.
Figure 3C:
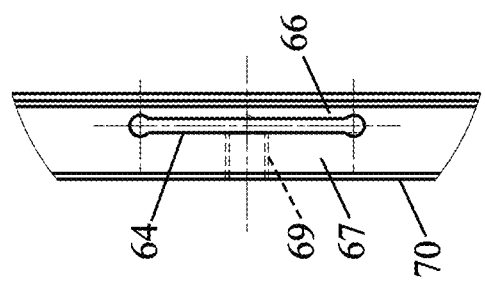

As can be seen in FIG. 3a, and in more detail in FIG. 3c, the system 62 to prevent unscrewing comprises a radial slot 64 extending in the peripheral assembly surface 63 of the retaining body 58. This slot 64 does not necessarily extend through the entire thickness of the retaining body 58 (in other words it may or may not open onto the inner surface 65 (opposite the outer surface 63) of the retaining body 58). This slot 64 thus separates a proximal portion 66 of the retaining body from a distal portion 67 of the retaining body. One will observe that the length of the distal portion along axis (B) may be greater than the length of the proximal portion in the example described.

The unscrewing system 62 further comprises a biasing system 68 to urge the proximal portion 66 and the distal portion 67 away from each other while tending to open said slot 64.

This biasing system 68 thus tends to press the threads of the distal portion 67 of the retaining body 58 against those of the ring 13, limiting the possibility of unscrewing the retaining body 58. The threads of the proximal portion 66 of the retaining body 58 are also pressed against those of the ring 13, limiting the possibility of unscrewing the retaining body 58.

To this end, according to one example, the biasing system 68 comprises an axial bore 69 provided in the distal portion 67 of the retaining body 58, extending axially from the distal surface 70 of the retaining body 58 and opening into the radial slot 64. The biasing system 68 also comprises a screw 71 that can be screwed axially into the bore 69 until it presses by its proximal and in particular flat end 75 against the proximal portion 66 of the retaining body 58, this proximal portion itself pressing against the axial abutment surface 59 of the outer ring 13.

According to one exemplary embodiment, in order to further limit the possibility of unscrewing, the system 62 to prevent unscrewing comprises a plurality of slots 64 distributed circumferentially, regularly or irregularly about axis (B), and a plurality of biasing systems 68 each associated with a slot 64 according to the mechanism described above. The practical example of the embodiment of FIGS. 3a-3d comprises two such pairs of slot/biasing system, distributed at 180° from one another about axis (B). Other variants are possible. The length of the slot 64 in the circumferential direction can be selected accordingly.

In some embodiments, the retaining body 58 may have a very small axial length in order to reduce the total axial footprint of the rolling bearing.

However, it may be necessary to disassemble the retaining body 58 from the rolling bearing for inspection, maintenance, or replacement of the sealing system.

For this purpose, it may for example be arranged for the retaining body 58 to further comprise an assembly/disassembly relief 72.

According to this specific example, the assembly/disassembly relief comprises at least one notch 73 formed on a mounting surface 74 of the retaining body 58 and having a shape complementary to a tool (not shown) for assembly/disassembly of the retaining body. In the present case, the notch may be made, for example, in both the distal surface 70 and the inner surface 65 of the retaining body, with a certain length in the peripheral direction.

In the present case, it is possible to provide several notches 73 that are distributed, for example equally distributed, along the circumference of the retaining body. It is possible, for example, to provide six notches 73. The locations of the notches 73 may be angularly offset relative to the locations of the slots 64, to avoid superposition of a notch and a slot which could potentially weaken the retaining body 58 at those locations.

The assembly/disassembly tool complementary to the assembly/disassembly relief, initially separate from the retaining body, can become integral with the retaining body by insertion into the notches 73, thus making it possible to unscrew the retaining body 58 from the retaining position, until detachment of the retaining body 58 from the ring of the rolling bearing.

In the event that the rolling bearing comprises a system 62 to prevent the unscrewing of the retaining body, this is preferably deactivated before disassembling the retaining body 58.

Assembly of the retaining body 58 could be carried out by a sequence of steps that are the reverse of the sequence described above for the disassembly.

To obtain a rolling bearing in accordance with the above description, it is possible to proceed as follows:

There is provided: at least one outer ring 13 having an inner surface 33 and an outer surface 34 opposite to the inner surface 33, the inner surface 33 of the outer ring 13 having an outer race 36; at least one inner ring 12 having an inner surface 24 and an outer surface 25 opposite to the inner surface 24, the outer surface 25 of the inner ring having an inner race 28, an inner space 43 being defined between the inner surface 33 of said at least one outer ring 13 and the outer surface 25 of said at least one inner ring 12, the inner space 43 extending between a proximal end 44 where it is closed off by a proximal sealing system 45 between at least one outer ring 13 and at least one Inner ring 11 and a distal end 46 where it is closed off by a distal sealing system 47 between at least one outer ring 13 and at least one inner ring 12; and at least one row of rolling elements 49 mounted in the inner space 43, rolling on the first outer and inner races 36, 28, with a portion of a thread/tapping system on a peripheral surface of one among the inner and outer races.

A retaining body 58 is provided comprising a portion of a thread/tapping system on a peripheral assembly surface 63 of the retaining body 58.

The portions of the thread/tapping system are placed opposite one another.

The retaining body 58 is screwed into a retention position in which an axial abutment surface 61 of the retaining body 58 forms an axial stop for the distal sealing system 47 longitudinally, in the proximal->distal direction.

If necessary, a system 62 to prevent the unscrewing of the retaining body is subsequently applied.

The invention claimed is:

1. A rolling bearing, wherein the rolling bearing is a blade root rolling bearing for a blade extending in a longitudinal direction between a proximal end and a distal end, the rolling bearing allowing oscillation of the blade root about an axis extending in the longitudinal direction relative to a housing, the rolling bearing comprising:
   at least one outer ring having an inner surface and an outer surface opposite to the inner surface, the inner surface of the outer ring having at least one outer race,
   at least one inner ring having an inner surface and an outer surface opposite to the inner surface, the outer surface of the at least one inner ring having at least one inner race,
      an inner space being defined between the inner surface of said at least one outer ring and the outer surface of said at least one inner ring, the inner space extending between a proximal end of said rolling bearing where it is closed off by a proximal sealing system between said at least one outer ring and said at least one inner ring and a distal end of said rolling bearing where it is closed off by a distal sealing system between said at least one outer ring and said at least one inner ring,
      at least one row of rolling elements mounted in the inner space, rolling on the outer race and the inner race,
      a loading system of the rolling bearing at said distal end of said rolling bearing,
      a distal-sealing-retention system for retaining the distal sealing system, said distal-sealing-retention system being distinct from the loading system and comprising a retaining body and a thread/tapping system formed on a peripheral assembly surface of the retaining body and on a peripheral surface of one among the inner ring and the outer ring facing the peripheral assembly surface of the retaining body, the retaining body being screwable into a retention position in which an axial abutment surface of the retaining body forms an axial stop for the distal sealing system longitudinally, in the proximal ->distal direction.

2. The rolling bearing for a blade root according to claim 1, wherein the distal-sealing-retention system further comprises a retaining-body-unscrewing-prevention system to prevent the unscrewing of the retaining body.

3. The rolling bearing for a blade root according to claim 2, wherein the retaining-body-unscrewing-prevention system comprises a radial slot extending from the peripheral assembly surface of the retaining body, separating a proximal portion from a distal portion of the retaining body, and a biasing system urging the proximal portion and the distal portion away from one another while tending to open said radial slot.

4. The rolling bearing for a blade root according to claim 3, wherein the biasing system comprises an axial bore formed in the distal portion of the retaining body and opening into the radial slot, and a screw having a bearing portion, axially screwable into the axial bore until it bears against the proximal portion of the retaining body (58).

5. The rolling bearing for a blade root according to claim 3, wherein the retaining-body-unscrewing-prevention system (62) comprises a plurality of said radial slots distributed circumferentially around the axis and a plurality of biasing systems, each of the biasing systems associated with one of the radial slots.

6. The rolling bearing for a blade root according to claim 1, wherein the retaining body further comprises an assembly/disassembly relief.

7. The rolling bearing for a blade root according to claim 6, wherein the assembly/disassembly relief comprises at least one notch formed on a mounting surface of the retaining body and having a shape complementary to a tool for assembly/disassembly of the retaining body.

8. A kit comprising a rolling bearing for a blade root according to claim 6, and an assembly/disassembly tool complementary to the assembly/disassembly relief, which can be secured to and detached from the retaining body, adapted for screwing the retaining body into the retention position.

9. An oscillating system comprising a rolling bearing according to claim 1, a housing received on a shoulder of the outer surface of the at least one outer ring for assembly with said housing, a blade comprising a blade root received on a shoulder of the inner surface of the at least one inner ring for assembly with said blade root, the blade being mounted so as to oscillate about said axis extending in the longitudinal direction relative to the housing by means of the rolling bearing.

10. A system rotating about an axis of rotation, the system comprising at least one oscillating system according to claim 9, extending radially relative to the axis of rotation, the rolling bearing being distanced from the axis of rotation.

11. A method for manufacturing a rolling bearing for a blade root, wherein:
   there is provided: at least one outer ring having an inner surface and an outer surface opposite to the inner surface, the inner surface of the outer ring having at least one outer race; at least one inner ring having an inner surface and an outer surface opposite to the inner surface, the outer surface of the inner ring having at least one inner race, an inner space being defined between the inner surface of said at least one outer ring and the outer surface of said at least one inner ring, the inner space extending between a proximal end where it is closed off by a proximal sealing system between the at least one outer ring and the at least one inner ring and a distal end where it is closed off by a distal sealing system between the at least one outer ring and the at least one inner ring; and at least one row of rolling elements mounted in the inner space, rolling on the at least one outer race and the at least one inner race, with a first portion of a thread/tapping system on a peripheral surface of one among said inner ring and said outer ring, a loading system for loading the rolling bearing is provided for assembly of the rolling bearing, a retaining body distinct from the loading system is provided, said retaining body comprising a second portion of said thread/tapping system on a peripheral assembly surface of the retaining body, the first portion and the second portion of the thread/tapping system are placed opposite one another, the retaining body is screwed into a retention position in which an axial abutment surface of the retaining body forms an axial stop for the distal sealing system longitudinally, in the proximal ->distal direction.

12. The method of manufacturing according to claim 11, wherein a retaining-body-unscrewing-prevention system to prevent the unscrewing of the retaining body is subsequently applied.

* * * * *